(12) United States Patent
Begg

(10) Patent No.: US 7,883,205 B2
(45) Date of Patent: Feb. 8, 2011

(54) CLIP-ON GLASSES WITH INTERCHANGEABLE LENSES

(75) Inventor: Robert G. Begg, Maple Ridge (CA)

(73) Assignee: 20 / 20 Marketing Ltd., Maple Ridge, CA (US)

(*) Notice: Subject to any disclaimer, the term of this patent is extended or adjusted under 35 U.S.C. 154(b) by 0 days.

(21) Appl. No.: 12/503,786

(22) Filed: Jul. 15, 2009

(65) Prior Publication Data

US 2010/0177274 A1 Jul. 15, 2010

(51) Int. Cl.
*G02C 9/00* (2006.01)

(52) U.S. Cl. .................. 351/48; 351/58; 351/103; 351/106

(58) Field of Classification Search .......... 351/41, 351/47, 48, 57, 58, 103–109, 154
See application file for complete search history.

(56) References Cited

U.S. PATENT DOCUMENTS

| | | | |
|---|---|---|---|
| 2,439,357 A * | 4/1948 | Bouchard ............... 351/106 |
| 4,504,127 A | 3/1985 | Cottet |
| 4,523,819 A | 6/1985 | Dianitsch et al. |
| 5,073,020 A * | 12/1991 | Lindberg et al. .......... 351/106 |
| 5,900,922 A | 5/1999 | Moore |
| 6,206,518 B1 * | 3/2001 | Peng et al. ............... 351/47 |
| 6,234,627 B1 | 5/2001 | Agnoli |
| 6,290,355 B1 * | 9/2001 | Chen .................... 351/103 |
| RE37,523 E | 1/2002 | Bondet |
| 6,517,202 B2 | 2/2003 | Huang |
| 6,533,412 B1 | 3/2003 | Wang et al. |
| 6,755,521 B1 | 6/2004 | Begg |
| 7,316,479 B1 | 1/2008 | Matera |
| 7,329,000 B2 | 2/2008 | Actis-Datta |
| 2005/0179856 A1 | 8/2005 | Van Atta et al. |
| 2008/0062379 A1 | 3/2008 | Sakai |

FOREIGN PATENT DOCUMENTS

CA 2338770 A1 2/2000

OTHER PUBLICATIONS

Kamen, Paddy, "Men Love Looking Great in New Eyewear Styles", http://www.bretoncom.com/vision/2005/05/02.asp, printed Mar. 12, 2008.
EBM Design Germany eyewear photographs, 2005.

* cited by examiner

*Primary Examiner*—Huy K Mai
(74) *Attorney, Agent, or Firm*—Oyen Wiggs Green & Mutala LLP

(57) ABSTRACT

A lens retaining structure for a secondary glasses assembly having a frame configured to be mounted on a pair of primary glasses. The lens retaining structure comprises an inner portion and an outer portion, each comprising a flexible, resilient member having a predetermined rest position. The inner portion has an inner lens grabber thereon and the outer portion has an outer lens grabber thereon. The inner and outer lens grabbers are configured to engage corresponding features of a lens. The inner and outer lens grabbers separated by a first distance when the inner and outer portions are in their rest positions, such that the lens retaining structure is operable to retain one of a plurality of lenses of differing sizes and shapes having corresponding features separated by a second distance which is different from the first distance.

15 Claims, 5 Drawing Sheets

CLIP-ON GLASSES WITH INTERCHANGEABLE LENSES

TECHNICAL FIELD

The invention relates to interchangeable lenses for glasses. More particularly, certain embodiments of the invention provide novel apparatus and methods for mounting lenses to secondary glasses such as clip-on glasses.

BACKGROUND

There exist a number of prior art glasses frames which allow users to change the lenses thereof Examples include U.S. Pat. No. 4,504,127 to Cottet, U.S. Pat. No. 4,523,819 to Dianitsch et al., U.S. Pat. No. 5,900,922 to Moore, U.S. Pat. No. 6,234,627 to Agnoli, U.S. Pat. No. RE37,523 to Bondet, U.S. Pat. No. 6,517,202 to Huang, U.S. Pat. No. 6,533,412 to Wang et al., U.S. Pat. No. 7,316,479 to Matera, and U.S. Pat. No. 7,329,000 to Actis-Datta, and U.S. Patent Application Publication No. 2005/0179856 to Van Atta et al.

The inventor has determined a need for improved apparatus and methods for providing interchangeable lenses for clip-on glasses.

SUMMARY

The following embodiments and aspects thereof are described and illustrated in conjunction with systems, tools and methods which are meant to be exemplary and illustrative, not limiting in scope.

One aspect of the invention provides a lens retaining structure for a secondary glasses assembly having a frame configured to be mounted on a pair of primary glasses. The lens retaining structure comprises an inner portion and an outer portion, each comprising a flexible, resilient member having a predetermined rest position. The inner portion has an inner lens grabber thereon and the outer portion has an outer lens grabber thereon. The inner and outer lens grabbers are configured to engage corresponding features of a lens. The inner and outer lens grabbers separated by a first distance when the inner and outer portions are in their rest positions, such that the lens retaining structure is operable to retain one of a plurality of lenses of differing sizes and shapes having corresponding features separated by a second distance which is different from the first distance.

Further aspects of the invention and details of example embodiments are described below.

BRIEF DESCRIPTION OF DRAWINGS

In drawings which illustrate non-limiting embodiments of the invention.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides structures for facilitating the interchange of lenses for clip-on glasses. Preferred embodiments permit lenses of different sizes and shapes to be held in place by the same structure. Lens retaining structures according to certain embodiments of the invention may be used with various types of clip-on glasses, other types of secondary glasses, or primary glasses.

FIGS. 1 to 7 show a clip-on glasses assembly 10 according to an example embodiment of the invention. Glasses assembly 10 comprises left and right frame portions 12 connected by a cross-piece 14. Frame portions 12 extend outwardly from the ends of cross-piece 14. In the illustrated embodiment, glasses assembly 10 is symmetrical, although symmetry is not required in all embodiments.

Figure 5:
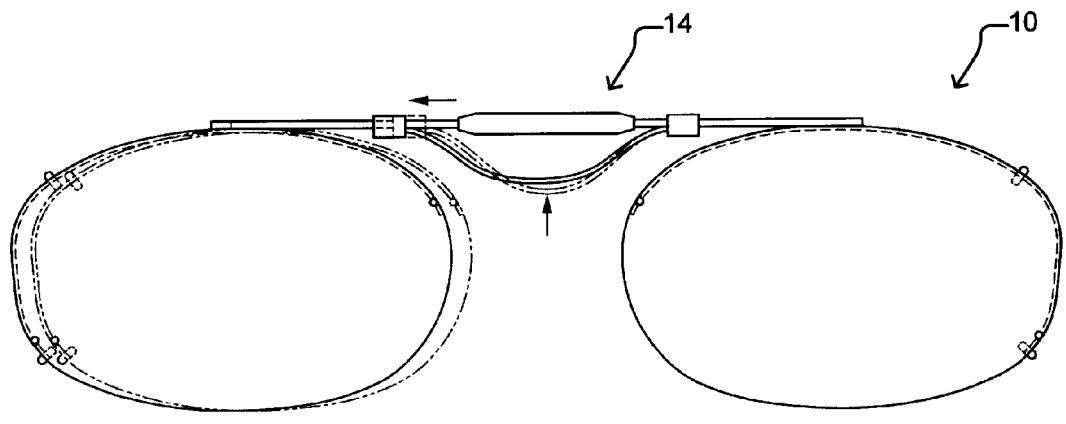
FIG. 5 illustrates the operation of the clip-on glasses assembly of FIG. 1.

In the illustrated embodiment, cross-piece 14 comprises an actuating mechanism (not specifically enumerated) for selectively moving frame portions 12 apart. For example, in some of the embodiments, cross-piece 14 may comprise an actuating mechanism such as one of those disclosed in U.S. Pat. No. 6,755,521 to Begg, which is hereby incorporated by reference herein. As illustrated in FIG. 5, a user may force left and right frame portions 12 apart by squeezing the actuating mechanism in such embodiments. In other embodiments, different actuating mechanisms may be provided.

In the illustrated embodiment, each frame portion 12 has at least one, and preferably at least two, grapples 16 thereon extending rearwardly therefrom. In other embodiments, different structures for coupling the secondary glasses to a pair of primary glasses may be provided. Grapples 16 are configured to engage the outer edges of a pair of primary glasses (not shown) on to which clip-on glasses assembly 10 may be mounted. In the illustrated embodiment, the actuating mechanism in cross-piece 14 is spring-loaded, such that grapples 16 bear against the outer edges of the primary glasses when the actuating mechanism is not being squeezed, thus holding clip-on glasses assembly 10 in place. Two grapples 16 are shown on each fixed arm 12 of the illustrated embodiment, but it is to be understood that different numbers and arrangements of grapples 16 may be provided for such types of clip-on glasses, so long as there is at least one grapple 16 on each fixed arm 12 to hold assembly 10 in place on the primary glasses. Grapples 16 may be coated with plastic in some embodiments to minimize wear on the primary glasses.

Clip-on glasses assembly 10 comprises a lens retaining structure 20 on each of the left and right sides thereof. Each lens retaining structure 20 comprises an inner portion 21 and an outer portion 22. The inner and outer portions 21 and 22 of each lens retaining structure 20 comprise inner and outer lens grabbers 23 and 24, respectively. Inner and outer lens grabbers 23 and 24 are preferably located at or near the ends of the corresponding portions 21 and 22 of lens retaining structure 20. Inner and outer lens grabbers 23 and 24 are configured to engage corresponding features on lenses L, such as, for example, inner and outer notches 25 and 26, as described below.

Inner and outer portions 21 and 22 are flexible, resilient members which may be used to retain lenses having a variety of shapes and sizes, as described below. Both inner and outer portions 21 and 22 of lens retaining structure 20 may be formed from a single piece of material in some embodiments, such as the embodiment shown in FIGS. 1 to 7. For example, inner and outer portions 21 and 22 of lens retaining structure 20 may comprise a single strip of a suitable memory metal material in some embodiments. In other embodiments, inner and outer portions 21 and 22 of lens retaining structures 20 may comprise separate elements. For example, FIG. 8 shows a clip-on glasses assembly 10A wherein each lens retaining structure 20A comprises an inner portion 21A and an outer portion 22A formed from separate pieces.

In some embodiments, lens retaining structures 20 may be attached to the front sides of the respective frame portions 12. In other embodiments, lens retaining structures 20 may be attached on either side of cross-piece 14 at locations in front of and adjacent to where left and right frame portions 12 are attached to cross-piece 14. The terms "front", "forward" and the like are used herein to refer to the direction in which a user wearing clip-on glasses 10 would be looking. Conversely, the terms "back", "rearward" and the like are used to refer to the opposite direction.

The inner and outer portions 21 and 22 of lens retaining structures 20 are constructed from a resilient material such as, for example, flat portions of memory metal. In some embodiments, lens retaining structures 20 may, for example, be constructed from titanium or stainless steel.

Lens retaining structures 20 are sufficiently flexible to be used to hold lenses of different sizes and shapes, as described below. Frame portions 12 may also be partially flexible, although lens retaining structures 20 must be at least as flexible, and preferably more flexible, than frame portions 12.

In the embodiment shown in FIGS. 1 to 7 the corresponding features on lenses L which are engaged by lens grabbers 23 and 24 comprise notches 25 and 26, respectively. Notches 25 and 26 are defined in the edges of lenses L at locations positioned to receive lens grabbers 23 and 24, respectively, when inner and outer portions 21 and 22 are pushed apart from their rest positions. The distance between notches 25 and 26 is thus larger than the distance between lens grabbers 23 and 24 when the inner and outer portions 21 and 22 are in their rest positions.

Figure 1:
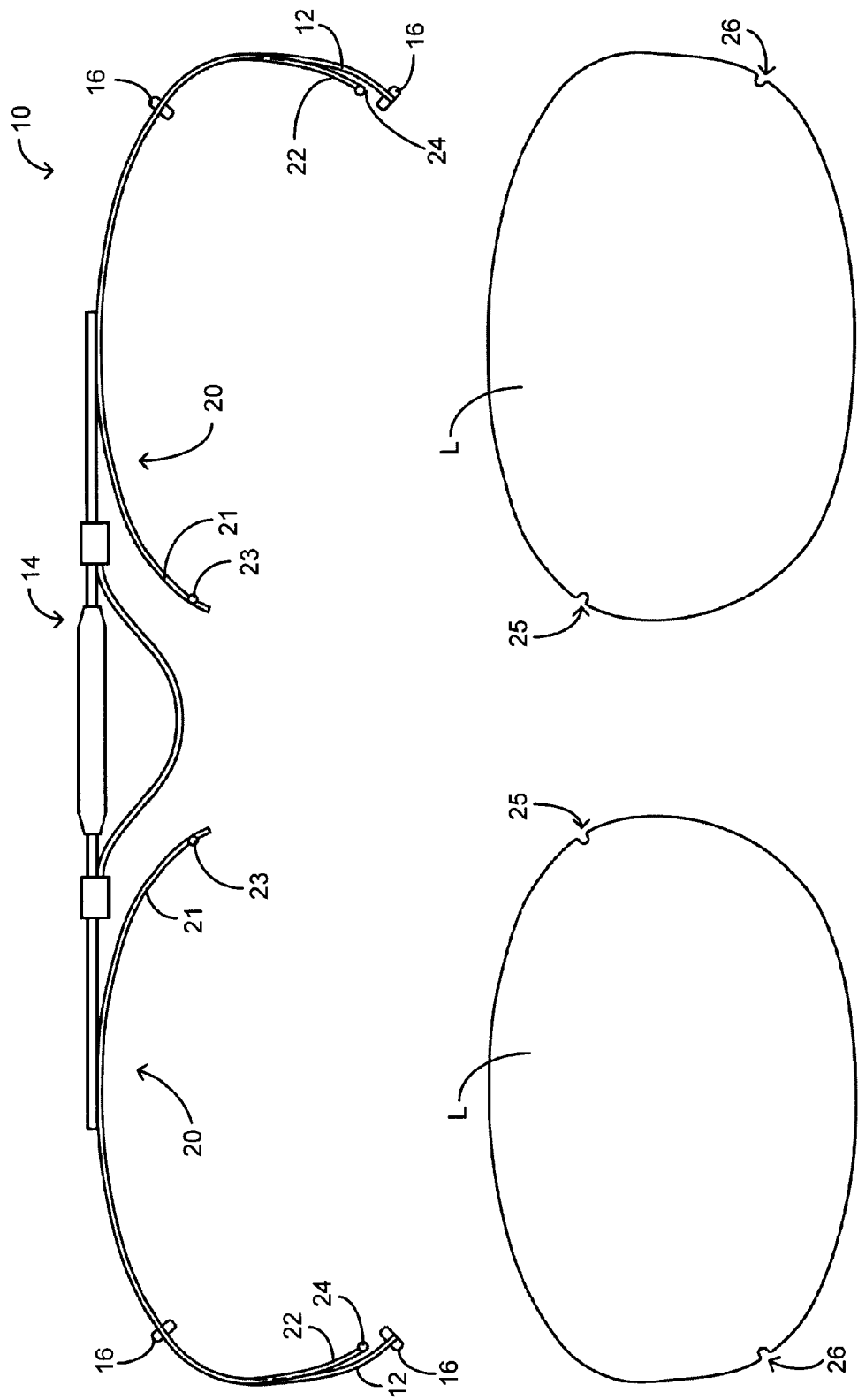
FIG. 1 shows a clip-on glasses assembly and a first pair of lenses therefor according to one embodiment of the invention.
Figure 2:
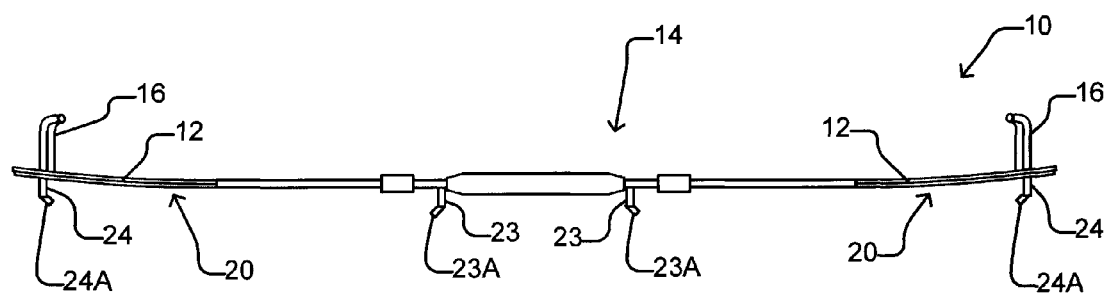
FIG. 2 is a top view of the clip-on glasses assembly of FIG. 1 with the lenses installed.
Figure 3:
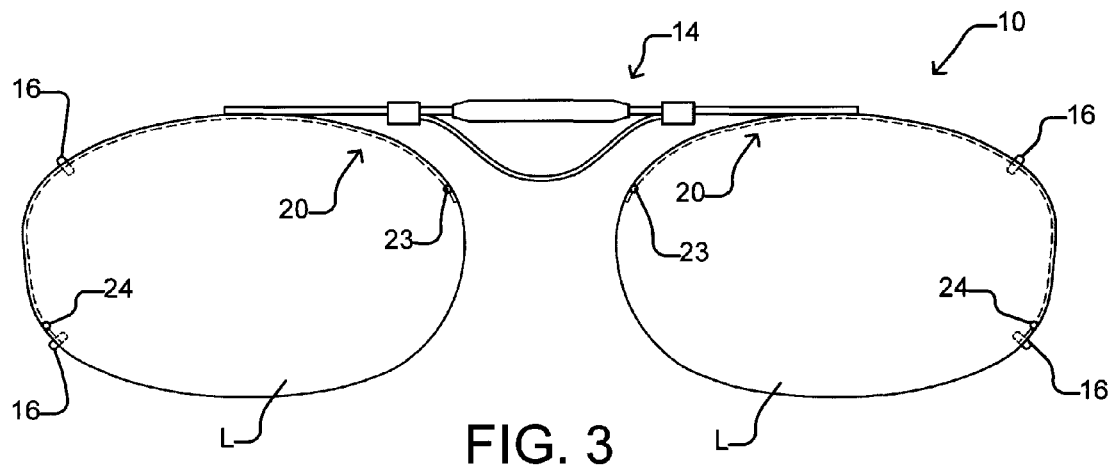
FIG. 3 is a front view of the clip-on glasses assembly of FIG. 1 with the lenses installed.
Figure 4:
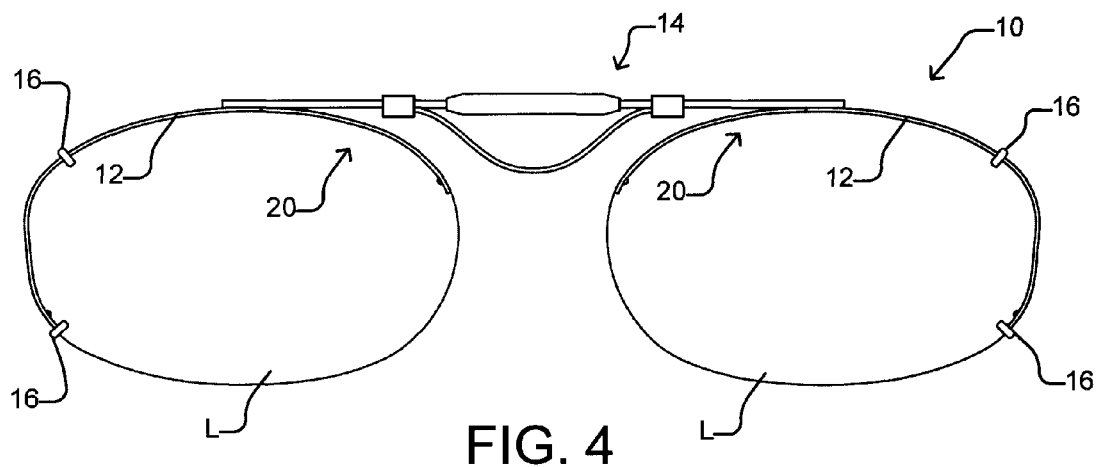
FIG. 4 is a rear view of the clip-on glasses assembly of FIG. 1 with the lenses installed.

Lens grabbers 23 and 24 and notches 25 and 26 preferably have complimentary shapes. For example, lens grabbers 23 and 24 may comprise generally cylindrical posts extending forwardly (i.e., in a direction in which a user faces when wearing clip-on glasses assembly 10) from lens retaining structures 20. Likewise, notches 25 and 26 may be rounded to accommodate cylindrical lens grabbers 23 and 24. However, as one skilled in the art will appreciate, lens grabbers 23 and 24 and notches 25 and 26 may have different shapes. As shown in FIG. 2, lens grabbers 23 and 24 may respectively have bent portions 23A and 24A on the fronts thereof angled inwardly with respect to lenses L to assist in holding lenses L in place.

Each lens retaining structure 20 is configured such that in its rest position (i.e. when it is not holding a lens and it is not being bent by a user) lens grabbers 23 and 24 are closer to one another than are notches 25 and 26 of any lens to be held by lens retaining structure 20. This ensures that when a lens is placed between inner and outer portions 21 and 22, inner and outer portions 21 and 22 are urged apart and away form their rest position. Lens retaining structures 20 thus force inner and outer lens grabbers 23 and 24 to bear against lens L at inner and outer notches 25 and 26, respectively, thereby holding lens L in place.

Figure 6:
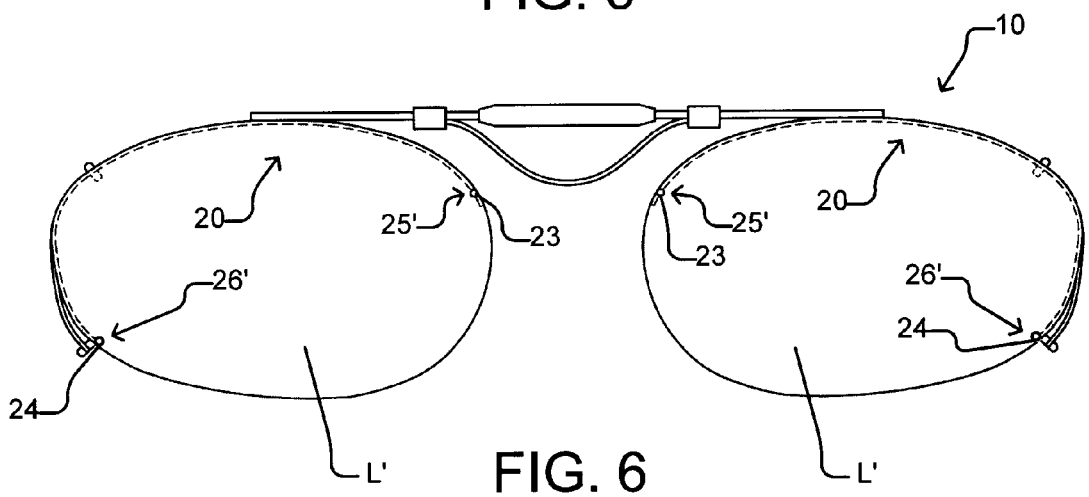
FIG. 6 shows the clip-on glasses assembly of FIG. 1 with a second pair of lenses installed.
Figure 7:
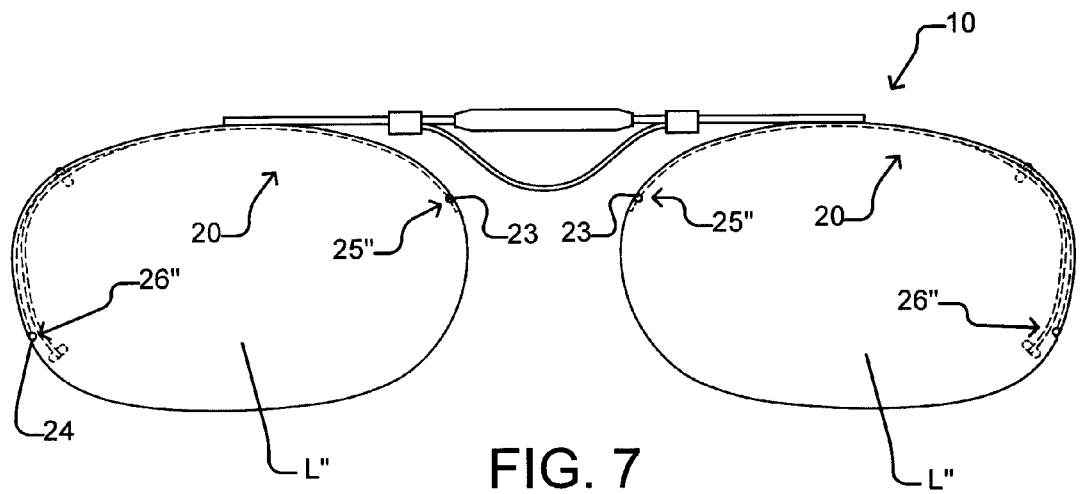
FIG. 7 shows the clip-on glasses assembly of FIG. 1 with a third pair of lenses installed.
Figure 8:
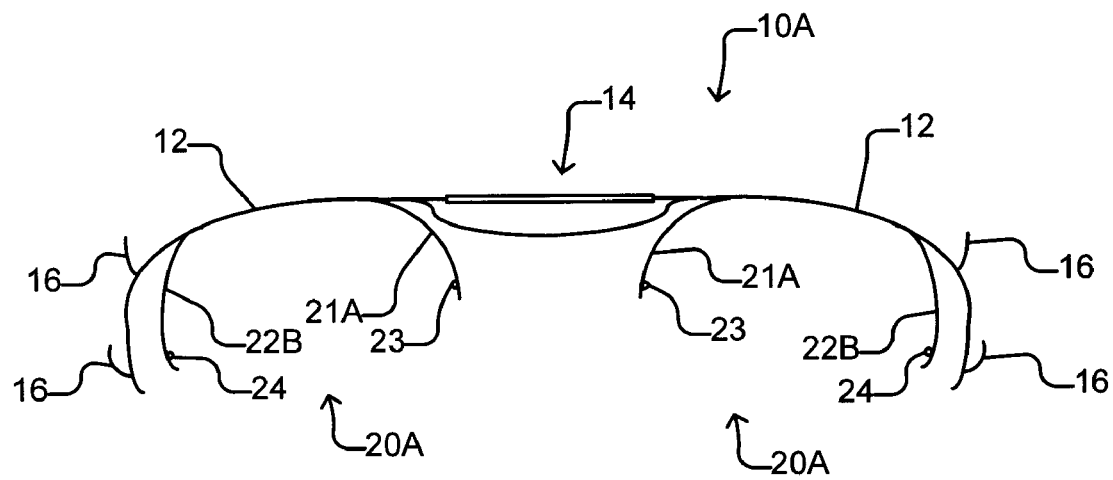
FIG. 8 shows a clip-on glasses assembly according to another embodiment of the invention.

As shown in FIGS. 6 and 7, lens retaining structures 20 may be used to secure lenses having a variety of sizes and shapes. FIG. 6 shows lens retaining structures 20 holding lenses L', which are smaller in area than lenses L of FIGS. 1-5. Notches 25' and 26' are positioned on lenses L' to receive lens grabbers 23 and 24. Accordingly, the circumferential distance (i.e., the distance along the edge of the lens) between notches 25' and 26' on lenses L' is the same as between notches 25 and 26 on lenses L.

Similarly, FIG. 7 shows lens retaining structures 20 holding lenses L", which are smaller in area than lenses L of FIGS. 1-5. Notches 25" and 26" are positioned on lenses L" to receive lens grabbers 23 and 24. Accordingly, the circumferential distance between notches 25" and 26" on lenses L" is also the same as between notches 25 and 26 on lenses L.

Figure 9:
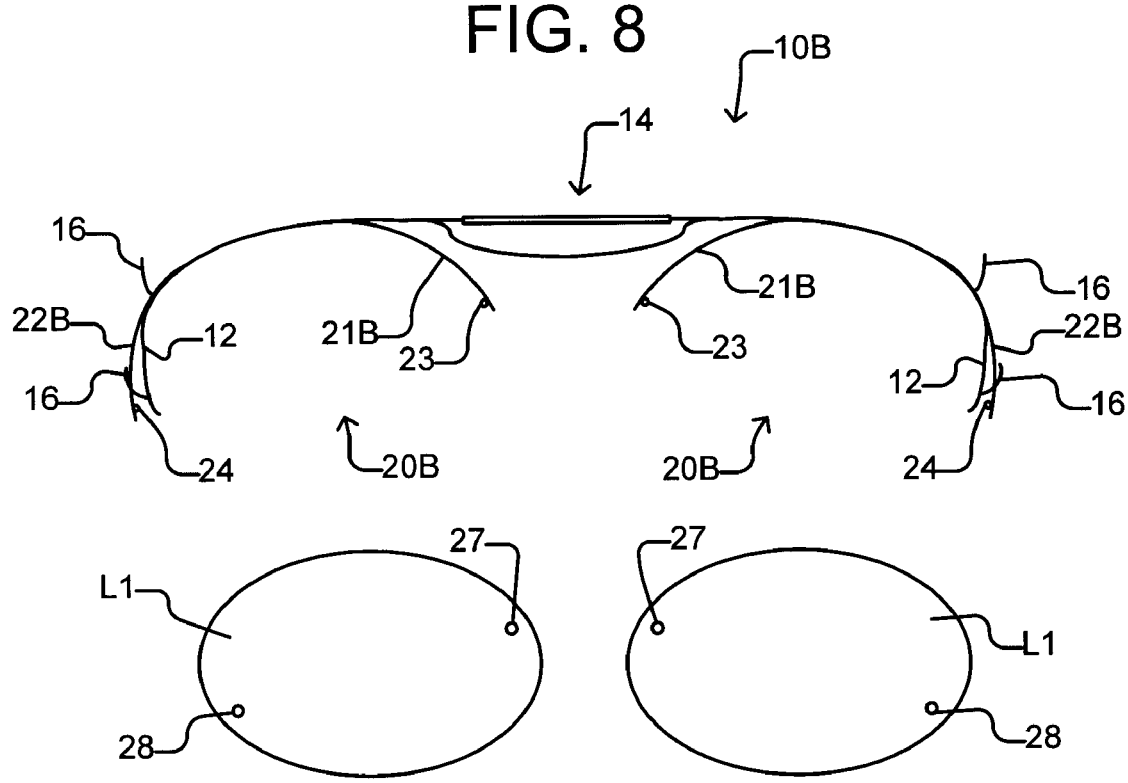
FIG. 9 shows a clip-on glasses assembly and a pair of lenses therefor according to another embodiment of the invention.

FIG. 9 shows a clip-on glasses assembly 10B according to another embodiment of the invention. Inner and outer portions 21B and 22B of lens retaining structures 20B of the FIG. 9 embodiment are configured such that when inner and outer portions 21B and 22B are in their rest positions, lens grabbers 23 and 24 are farther apart than are the corresponding features on lenses L1. In the FIG. 9 embodiment, the corresponding features which are engaged by lens grabbers 23 and 24 comprise holes 27 and 28, respectively, defined in lenses L1. Accordingly, lens grabbers 23 and 24 of the FIG. 9 embodiment will typically not have bent portions at the ends thereof, but may optionally be provided with removable cap members (not shown) to be attached to the ends of lens grabbers 23 and 24 after they have been inserted through holes 27 and 28.

The distance between holes 27 and 28 is less than the distance between lens grabbers 23 and 24 when inner and outer portions 21B and 22B of the FIG. 9 embodiment are in their rest positions. Lenses L1 may be retained by lens retaining structures 20B by squeezing inner and outer portions 21B and 22B together slightly and inserting lens grabbers 23 and 24 through holes 27 and 28. Inner and outer portions 21B and 22B will thus attempt to return to their rest positions and force lens grabbers 23 and 24 to bear against the sides of holes 27 and 28, thereby holding lenses L1 in place. Lens retaining structures 20B of clip-on glasses assembly 10B can thus also be used to retain lenses having a variety of sizes and shapes, provided that the lenses have appropriately places holes defined therein separated by a distance which is less than the distance between lens grabbers 23 and 24 when inner and outer portions 21B and 22B are in their rest positions.

Figure 10:
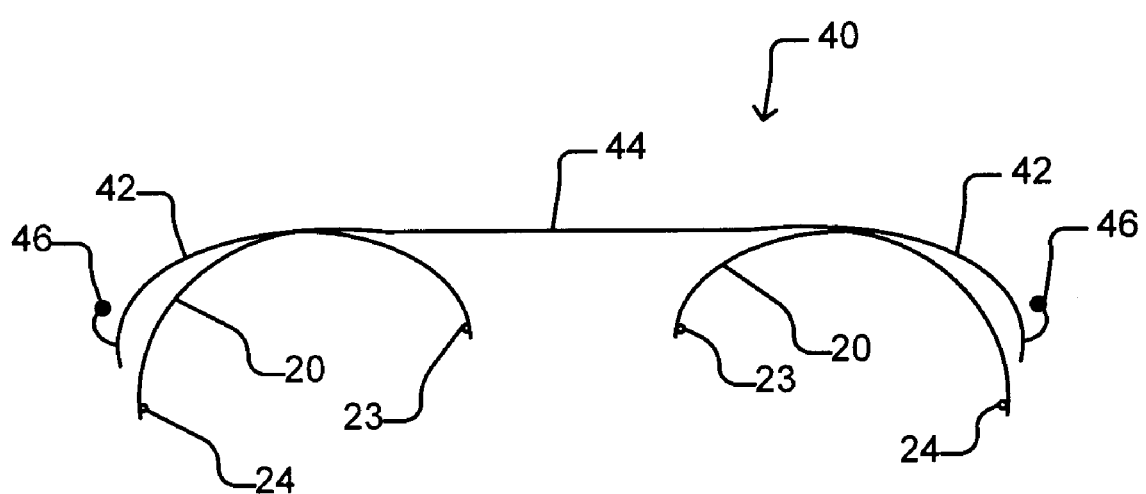
FIG. 10 shows a different type of secondary glasses assembly according to another embodiment of the invention.

FIG. 10 shows a pair of magnetically mounted secondary glasses assembly 40 according to another embodiment of the invention. Glasses assembly 40 comprises left and right frame portions 42 connected by a cross piece 44. Magnetic mounting members 46 are provided on the outer edges of frame portions 42 for mounting glasses assembly 40 to a pair of primary glasses (not shown). A lens retaining structure 20 is attached to each frame portion 42. Lens retaining structure 20 is the same as described above, and will not be described again to avoid unnecessary repetition.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A clip-on glasses assembly mountable on a pair of primary glasses, the clip-on glasses assembly comprising:
    a frame configured to be mounted in front of the pair of primary glasses;
    a pair of lens retaining structures, each lens retaining structure in front of and attached to the frame adjacent the other lens retaining structure, each lens retaining structure comprising:
        an inner portion and an outer portion, each of the inner and outer portions comprising a flexible, resilient member having a predetermined rest position, the inner portion having an inner lens grabber thereon and the outer portion having an outer lens grabber thereon, the inner and outer lens grabbers configured to bearingly engage corresponding features of each of a plurality of lenses, the inner and outer lens grabbers separated by a first distance when the inner and outer portions are in their rest positions, the lens retaining structure operable to interchangeably retain each of the plurality of lenses, the corresponding features of each of the plurality of lenses separated by a second distance that is different from the first distance and different from the distance between corresponding features of the other lenses.

2. A clip-on glasses assembly according to claim 1 wherein the first distance is smaller than the second distance, and wherein the corresponding features of the lenses comprise notches defined along an edge of the lenses.

3. A clip-on glasses assembly according to claim 2 wherein the inner and outer lens grabbers extend forwardly from the inner and outer portions and wherein each of the inner and outer lens grabbers comprises a bent front portion angled inwardly with respect to the lenses.

4. A clip-on glasses assembly according to claim 1 wherein the first distance is larger than the second distance, and wherein the corresponding features of the lenses comprise holes defined through the lenses.

5. A clip-on glasses assembly according to claim 1 wherein the inner and outer portions are constructed from a single piece.

6. A clip-on glasses assembly according to claim 1 wherein the inner and outer portions are constructed from separate pieces.

7. A clip-on glasses assembly according to claim 1 wherein the inner and outer lens grabbers extend forwardly from the inner and outer portions.

8. A lens retaining structure for a secondary glasses assembly having a frame configured to be mounted on a pair of primary glasses, the lens retaining structure comprising:
    an inner portion and an outer portion, each of the inner and outer portions comprising a flexible, resilient member having a predetermined rest position, the inner portion having an inner lens grabber thereon and the outer portion having an outer lens grabber thereon, the inner and outer lens grabbers separated by a first distance when the inner and outer portions are in their rest positions, the lens retaining structure operable to interchangeably retain each of a plurality of lenses by the inner and outer grabbers bearing against corresponding features of the lenses, the corresponding features separated by a second distance that is different from the first distance and different from the distance between corresponding features of the other lenses.

9. A lens retaining structure according to claim 8 wherein the corresponding features of each of the plurality of lenses are separated by the same circumferential distance as the corresponding features of the other lenses.

10. A lens retaining structure according to claim 8 wherein the first distance is smaller than the second distance, and wherein the corresponding features of the lenses comprise notches defined along an edge of the lenses.

11. A lens retaining structure according to claim 10 wherein the inner and outer lens grabbers extend forwardly from the inner and outer portions and wherein each of the inner and outer lens grabbers comprises a bent front portion angled inwardly with respect to the lens.

12. A lens retaining structure according to claim 8 wherein the first distance is larger than the second distance, and wherein the corresponding features of the lenses comprise holes defined through the lenses.

13. A lens retaining structure according to claim 8 wherein the inner and outer portions are constructed from a single piece.

14. A lens retaining structure according to claim 8 wherein the inner and outer portions are constructed from separate pieces.

15. A lens retaining structure according to claim 8 wherein the inner and outer lens grabbers extend forwardly from the inner and outer portions.

* * * * *